(12) United States Patent
DeFelice et al.

(10) Patent No.: US 6,414,884 B1
(45) Date of Patent: Jul. 2, 2002

(54) METHOD AND APPARATUS FOR SECURING ELECTRONIC CIRCUITS

(75) Inventors: Richard Alden DeFelice, Bernardsville, NJ (US); Paul A. Sullivan, Basalt, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/498,006

(22) Filed: Feb. 4, 2000

(51) Int. Cl.[7] .................................................. G11C 7/00
(52) U.S. Cl. ........................ 365/195; 365/196; 257/922; 438/130
(58) Field of Search ................................ 438/130, 455; 257/922, 777, 778, 678; 365/53, 195, 196, 52

(56) References Cited

U.S. PATENT DOCUMENTS

| | | | |
|---|---|---|---|
| 4,670,770 A | | 6/1987 | Tai ................................. 357/60 |
| 5,072,331 A | * | 12/1991 | Thiele et al. ................ 361/380 |
| 5,185,717 A | * | 2/1993 | Mori ............................. 365/52 |
| 5,534,465 A | | 7/1996 | Frye et al. .................... 437/209 |
| 5,747,982 A | | 5/1998 | Dromgoole et al. ......... 323/902 |
| 5,824,571 A | * | 10/1998 | Rollender et al. ........... 438/130 |
| 5,834,160 A | | 11/1998 | Ferry et al. ................... 430/313 |
| 5,861,652 A | * | 1/1999 | Cole et al. .................... 257/386 |
| 5,880,523 A | * | 3/1999 | Candelore ..................... 257/679 |
| 5,998,858 A | * | 12/1999 | Little et al. .................. 257/678 |

OTHER PUBLICATIONS

Ho, C. W., et al., "The Thin–Film Module as a High–Performance Semiconductor Package," IBM J. Res. Develop., vol. 26, No. 3, May 1982.

Kraynak, P. et al., "Wafer–Chip Assembly for Large Scale Integration," IEEE Transactions on Electron Devices, vol. ED–15, No. 9, Sep. 1968, pp. 660–663.

* cited by examiner

*Primary Examiner*—Son Mai
(74) *Attorney, Agent, or Firm*—Mayer, Fortkort & Williams, LLC

(57) ABSTRACT

A method and apparatus for protecting the stored information on an integrated circuit from being compromised through reverse engineering. To do so, the method and apparatus splits the functionality of an integrated circuit into two separate integrated circuits, which are then connected in an interlocking manner. A detection circuit monitors the interconnection of the two separate integrated circuits. Upon detection of a break in the interconnection of the two circuits, the detection circuit destroys the data stored in the two separate integrated circuits. The two integrated circuits are connected in a flip-chip fashion, thereby preventing access to the underlying conduction paths and charge storage sites which are normally used in reverse engineering an integrated circuit.

25 Claims, 8 Drawing Sheets

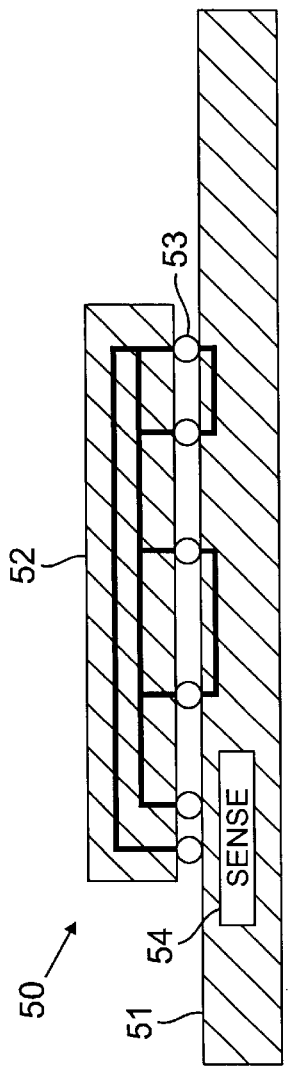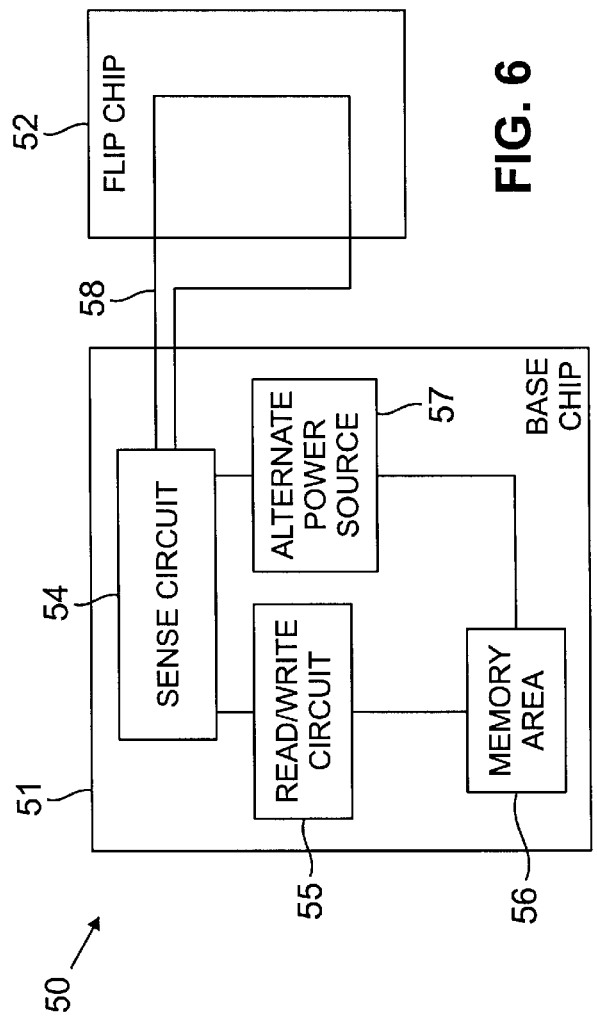

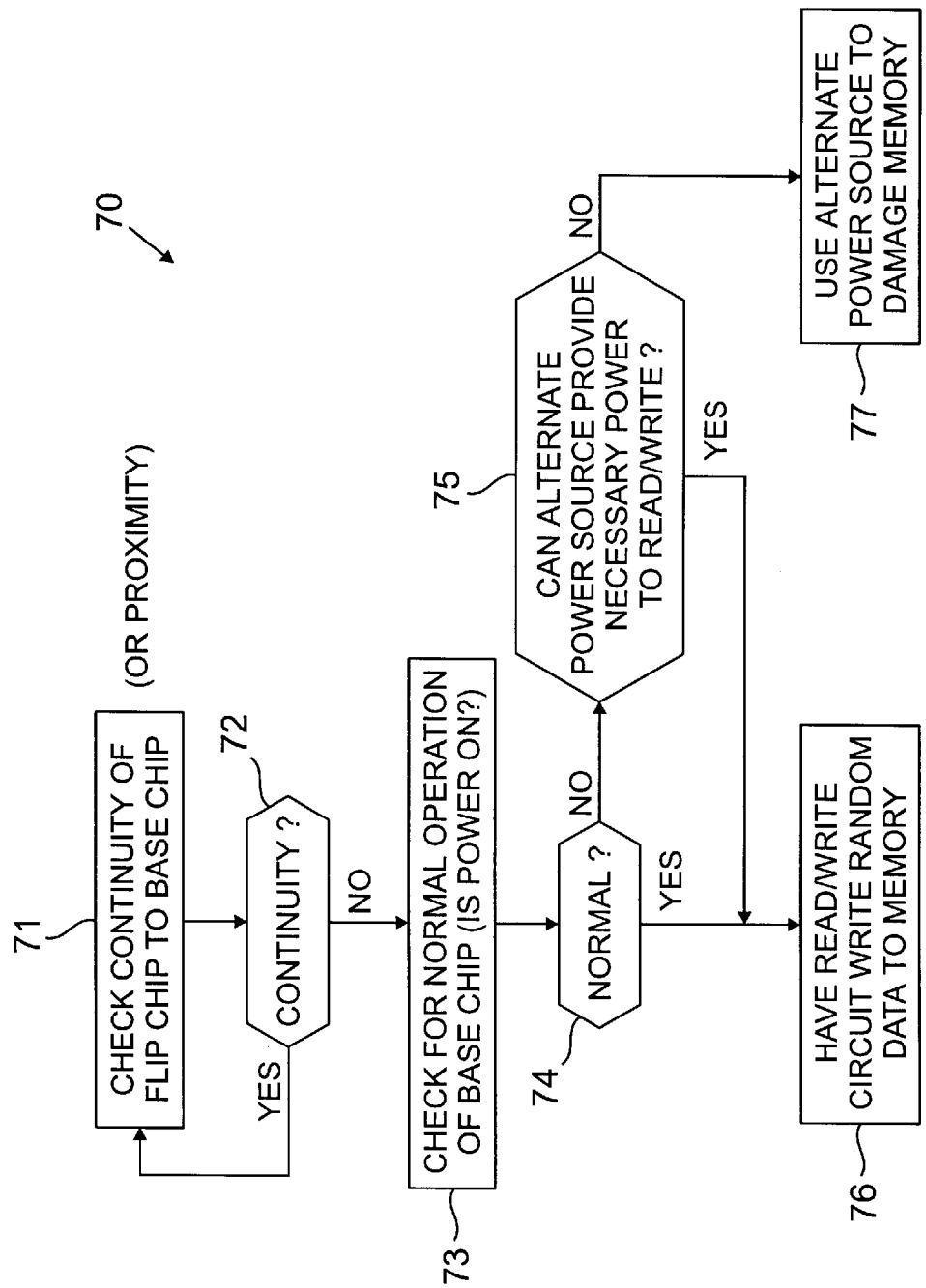

METHOD AND APPARATUS FOR SECURING ELECTRONIC CIRCUITS

BACKGROUND OF THE INVENTION

The present invention relates generally to methods and apparatuses for protecting electronic systems from theft of sensitive information, and more particularly to a method and apparatus for protecting an electronic system from theft of sensitive information by preventing reverse engineering of the circuits employed in the electronic system.

Many electronic systems and devices use data encryption security schemes to protect sensitive information, e.g., personal data, financial transaction authorization codes, security passwords, etc. These schemes rely on a stored encryption key or security key that must be physically and electrically inaccessible to unauthorized access.

Storage methods include magnetic storage, e.g., disk drives, optical storage, compact disks and electronic media (such as memory integrated circuits). Disk storage, both magnetic and optical, is not secure because data can be read off the disks and reverse engineered by various methods to determine the encryption or security keys.

For added security, the keys can be stored in an electronic memory circuit on an integrated circuit. Specialized equipment is required to remove the packaging materials of these devices and reverse engineer the key. However, integrated circuits are vulnerable to reverse engineering—even data stored in FLASH or EEPROM or other non-volatile memory or battery backed memories.

Some methods used to enhance the security of these integrated circuits include physical approaches, e.g., 1) locking or sealing cases to enclose the circuit boards on which memory devices are mounted, 2) using special packaging that destroys the integrated circuit if there is tampering, or 3) using metal layers to mask the storage elements from sensing equipment. For example, FIG. 3 depicts an implementation of the third method above in a cross-sectional view. The chip including the transistors is covered with several thick metallization layers. As recognized by the prior art, the transistor tubs generate heat that can be scanned to determine which transistor is charged, thereby decoding the stored information. Alternatively, circuit reverse engineering can be performed to determine the encryption keys. To prevent either of these possibilities, thick layers of metallization are used to spread the thermal signature. This security protection can be defeated by partial and complete removal of portions of the metallization layer.

FIG. 4 depicts a detailed view of the implementation shown in FIG. 3. As evident, the thermal signature exists on the surface of the chip. Scanning equipment can also be used to detect the charge levels on the chip surface.

Other security methods include electronic circuitry, e.g., circuits that detect removal of power to the system/device, sensors that detect tampering, and continuity circuits in the packaging or on the integrated circuits that scramble stored data if tampering is detected.

All of the above methods are vulnerable to one sophisticated in the art of reverse engineering. For example, continuity circuitry can be defeated by ensuring that power is constantly applied, metal lids can be shorted with jumpers, ceramic packages that shatter if opened and metal layers deposited over portions of the integrated circuit can be etched away by physical and mechanical means.

Once the circuitry of the chip is exposed, sensing equipment, such as a low voltage scanning electron microscope (SEM) or a thermal scanner can be used to determine the stored charges of transistors on the chip and decode the keys. Alternatively, probes can be used to directly or indirectly sense charges on the chip.

The present invention is therefore directed to the problem of developing a method and apparatus for protecting an integrated circuit from being reverse engineered so that the stored information on the circuit cannot be determined.

SUMMARY OF THE INVENTION

The present invention solves this problem by splitting the functionality of an integrated circuit into two separate chips which are then connected in an interlocking manner. In addition, the present invention provides a detection circuit that monitors the interconnection of the two chips, and which destroys the stored data upon detection of a break in the interconnection of the two chips.

In one embodiment of the present invention, the two chips are connected in a flip-chip fashion, thereby preventing access to the underlying conduction paths and charge storage sites which are used in reverse engineering an integrated circuit.

In an alternative embodiment of the above embodiment, the flip-chip is only provided over a portion of the active chip that includes the sensitive information. This reduces the size and complexity of the total device.

BRIEF DESCRIPTION OF THE DRAWINGS

FIG. 5 depicts a cross-sectional view of an exemplary embodiment of one aspect of the present invention.

FIG. 6 depicts the exemplary embodiment shown in FIG. 5 in a circuit block diagram.

FIG. 7 depicts an exemplary embodiment in a flow chart form of a continuity detection algorithm according to one aspect of the present invention.

DETAILED DESCRIPTION

Figure 1:
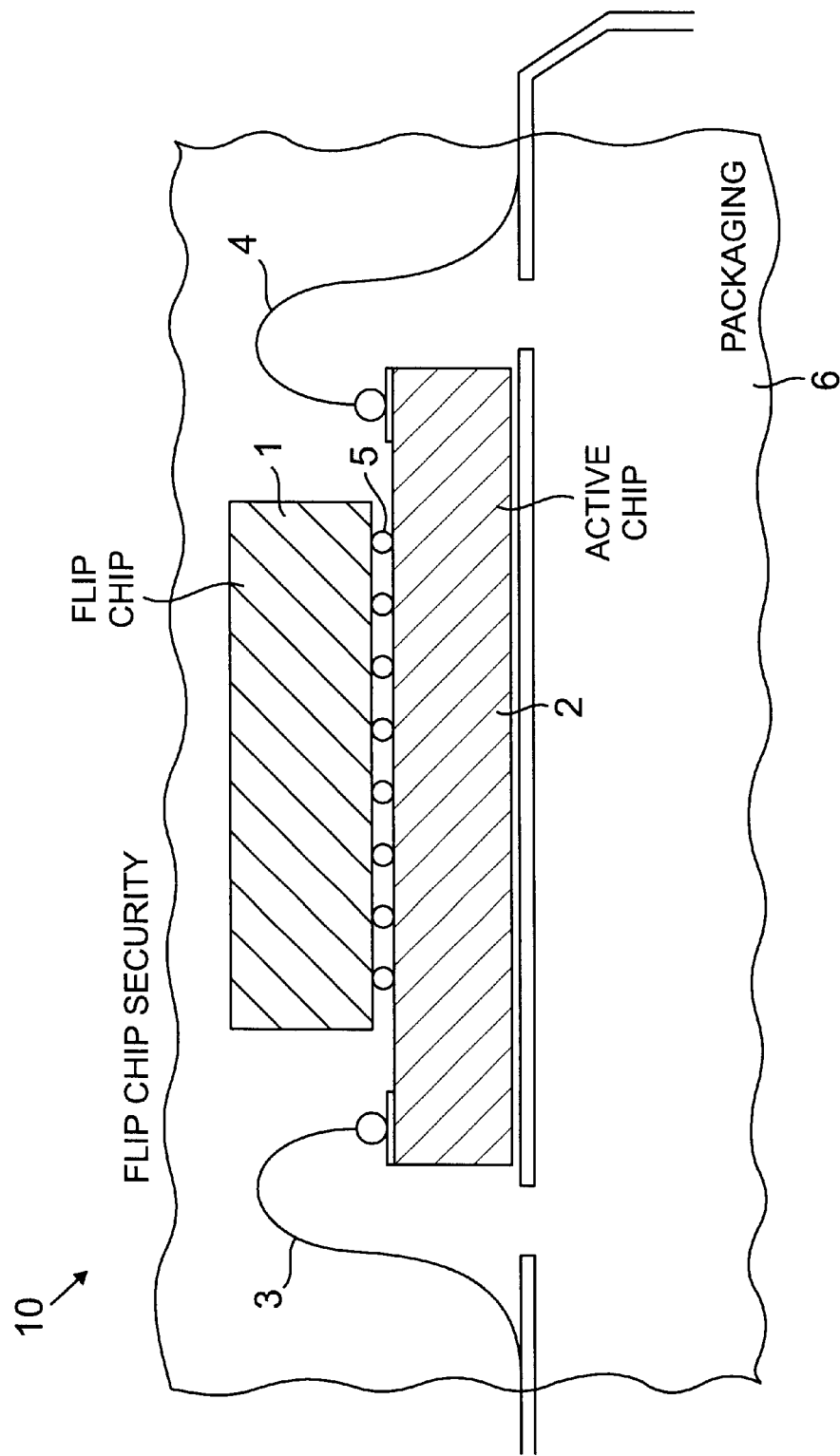
FIG. 1 depicts an exemplary embodiment of an apparatus according to one aspect of the present invention in a cross-sectional view.

The present invention employs a chip-on-chip structure to provide security for the two chips involved. Attaching a second chip directly on top of a first chip (i.e., the sensitive chip), which second chip is electrically connected to the sensitive chip, protects the sensitive chip (or area of the sensitive chip) from external aggression or attack. This structure physically shields the integrated circuit at the point where the sensitive data is stored, thereby preventing surface scanning. As a result of this configuration, the internal pins in this chip sandwich are also inaccessible to probes. Moreover, circuitry provided on the flip-chip or memory chip detects when the flip-chip is removed or when attempts are made to etch away portions of the flip-chip. Upon detection of such tampering, the sensitive data is then scrambled or deleted. The sensitive data includes any information that one might wish to protect from theft, such as encryption keys, trade secret data, financial information, etc.

Another aspect of the present invention provides that sensitive information, such as encryption keys, are stored in memory elements of the same integrated circuits that process the data using the keys. This configuration minimizes the transfer of the sensitive data through device pins and along circuit board conductive paths that could otherwise be monitored by sensing equipment.

Flip-chip manufacturing techniques described in the art are used to enable attachment and connection of integrated circuit chips to each other and to substrates. The present invention employs those techniques to create a "chip sandwich" that protects the sensitive information, e.g., encryption keys (or data ), from reverse engineering.

In one exemplary embodiment of the present invention, the integrated circuit containing encryption keys is attached with its active side down to a substrate using solder bump flip-chip methods described by U.S. Pat. No. 4,670,770 issued to Tai, King L and U.S. Pat. No. 5,534,465 to Frye, R. C. et al of Bell Laboratories, or other techniques such as those described by C. W. Ho et al., "The Thin-Film Module as a High Performance Semiconductor Package," IBM Journal of Research and Development, Vol. 26, No. 3, May 1982, pp. 287–296, which discusses a multi-chip module of silicon chips attached to thin-film transmission lines, or by P Kraynak et al., "Wafer-Chip Assembly for Large Scale Integration," IEEE Transactions on Electron Devices, Vol. ED-15, No. 9, September 1968, pp. 660–663, where silicon chips are bonded "face down" on a silicon wafer. The above patents are hereby incorporated by reference, as if repeated herein in their entirety, including the drawings. By flipping the chip over so that its active side is not exposed, the desired physical protection described above is achieved.

If more protection is desired, circuitry may be added to the integrated circuit that detects when the "chip sandwich" is pried apart. This detection circuitry may detect an interruption of power and/or ground to the chip or a break in the continuity of one or more connections between the flip-chip and the substrate. When tampering is detected, the circuitry deletes or corrupts the information in the memory elements using power from the system. Alternatively, one or more batteries or other charge storage devices, such as a capacitors, can be used to provide power for the tampering detection circuitry and the scrambling or deletion circuitry. This configuration thereby provides the electrical protection and isolation from probes describe above.

In another exemplary embodiment of one aspect of the present invention, a flip-chip is placed on top of a second integrated circuit chip that stores the keys, and the chip sandwich is packaged for assembly using conventional techniques. In addition, the flip-chip contains a grid or pattern of electrically conductive lines that maintain continuity with the integrated circuit below. The integrated circuit employs a circuit to determine whether continuity between the chips or along one or more of the conductive lines is interrupted or broken (as might happen if the flip-chip were etched away to expose the memory elements below.) When an interruption or break in continuity is detected, the stored key data is erased or scrambled.

In a third exemplary embodiment of one aspect of the present invention, the continuity detection circuitry and one or more charge storage elements are placed on the flip-chip so that a standard off the shelf memory device may be used. This reduces the cost and complexity of the manufacturing process, thereby enabling use of this configuration in more inexpensive applications.

A fourth exemplary embodiment of one aspect of the present invention employs a flip-chip mounted memory device, which is mounted directly onto an information-processing device so that all interconnections between the two devices (along which sensitive or key data is transferred) lie within the "chip sandwich."

For some memory devices, a high voltage is required to corrupt or erase the information contained therein. In these cases, the charge storage device described in the above embodiments may include capacitors that are charged in parallel to a given voltage. When a continuity fault is detected, transistors switch the configuration from a parallel configuration to a series configuration, thereby producing a voltage sufficiently high to destroy or scramble the information stored in the memory elements.

Referring now to FIG. 1, which depicts an exemplary embodiment 10 of an apparatus according to one aspect of the present invention in a cross-sectional view, a flip-chip 1 is mounted on an active chip 2. Grounds 3 and power supply leads 4 are shown coupled to the active device 2. Conventional packaging 6 surrounds the flip-chip 1 and active device 2 configuration. The active chip 2 and the flip-chip 1 are coupled by solder bonds 5. As discussed above, the continuity of the connection between the flip-chip 1 and the active chip 2 is monitored. If continuity is broken, the memory is overwritten with random data or otherwise made unusable. Various techniques are possible, some of which include writing random data, writing all ones or zeros, and applying an unsuitable voltage to the memory thereby destroying it.

Figure 2:
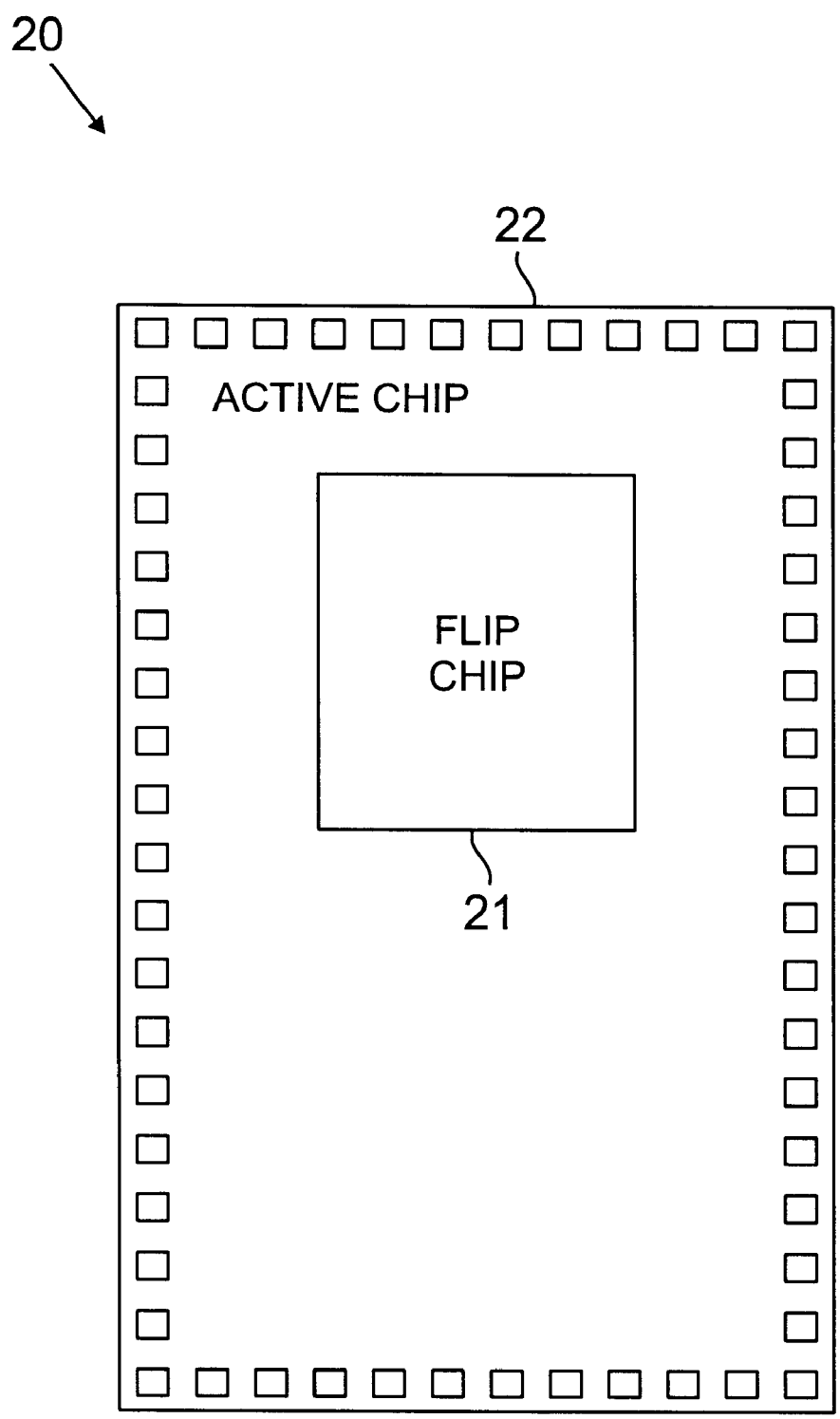
FIG. 2 depicts a top view of the exemplary embodiment shown in FIG. 1.
Figure 3:
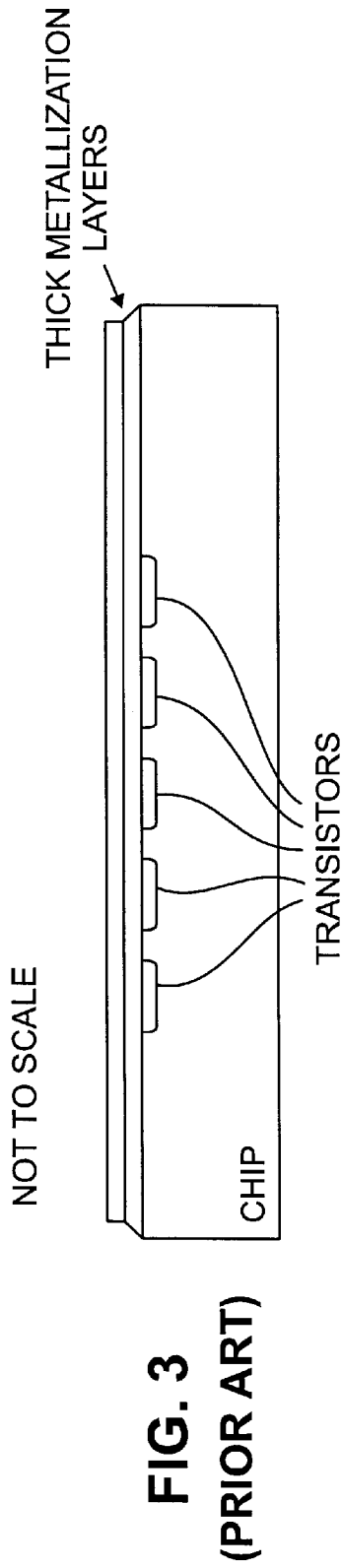
FIG. 3 depicts a prior art implementation in a cross-sectional view.
Figure 4:
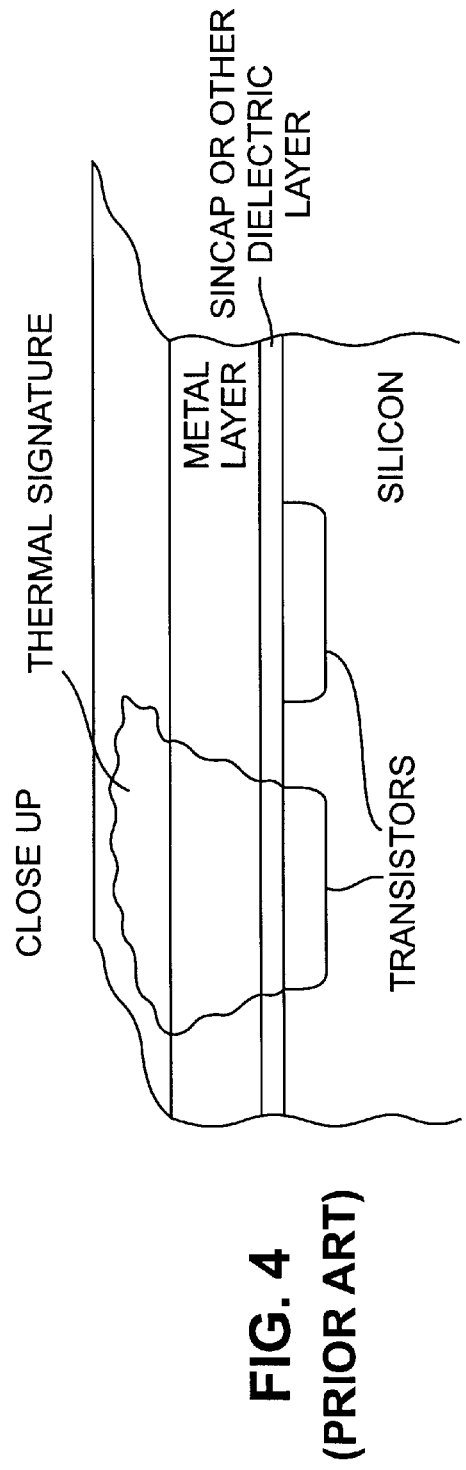
FIG. 4 depicts a detailed view of the prior art implementation shown in FIG. 3.

Referring to FIG. 2, an alternative embodiment 20 of one aspect of the present invention is shown therein. In this embodiment 20, the flip-chip 21 is placed over an area on the active chip 22 in which sensitive information, such as an encryption key, is stored. In this embodiment 20, the flip-chip protects only the portion of the active chip 22 that contains the sensitive information. It is not necessary for the flip chip 21 to cover the entire active chip 22. This exemplary embodiment reduces the overall size of the device, for those applications in which size is important, such as laptops, palm-based devices, etc.

Referring to FIG. 5, shown therein is a cross-sectional view of an exemplary embodiment 50 of one aspect of the present invention. According to one aspect of the present invention, when encryption key memory on the processing chip 51 or a dedicated memory chip (base chip) is used, a passive flip chip 52 makes continuity between flip-chip bond pads 53 and the base chip 51 As shown in FIG. 5, a sense circuit 54 disposed on the active chip 51 senses when continuity is broken or otherwise interrupted and sends a signal to a read/write circuit 55 (see FIG. 6) to write random data to memory 56. If the read/write circuit 55 is not enabled, the sense circuit 54 can be triggered to trash the memory 56.

According to yet another aspect of the present invention, an apparatus for storing information includes two integrated circuits and a detection monitoring circuit. One integrated circuit has several charge storage sites in which charges are stored representing the information to be stored. Another integrated circuit is coupled to the other integrated circuit in a flip-chip configuration and prevents access to the charge storage sites disposed therein. The detection circuit is disposed in one of the integrated circuits and monitors a connection between the two integrated circuits, and then alters the information stored therein upon detecting a break in the connection. The detection circuit may also or alternatively detect a proximity of the two integrated circuits. Depending upon the circuit layout of the circuit storing the sensitive information, the other integrated circuit may be disposed over only the portion of the integrated circuit storing the sensitive information.

Configuring the two integrated circuits so that the one of the integrated circuits covers the conduction paths on the other storing the sensitive information (thereby making the conduction paths inaccessible without separation of the two chips) is also desirable to prevent reverse engineering of the sensitive information. In addition, if the detection circuit monitors multiple conduction paths between the two integrated circuits, the overall security of the configuration is enhanced.

Moreover, to further increase the security of the configuration, a read-write circuit is coupled to the detection circuit and the charge storage sites. The detection circuit then enables the read-write circuit to write false data to the charge storage sites upon detection of a break in continuity False data can include any data that makes the stored information unusable, such as all ones, all zeros, random data, replacement but inaccurate data, etc.

In addition, an alternate power source is coupled to the detection circuit, which provides power to the detection circuit upon removal of normal supply power. The alternate power source also provides power to the read-write circuit upon removal of normal supply power. Furthermore, the alternate power source provides an unsuitable voltage to the charge storage sites upon detection of a break in the continuity by the detection circuit. An unsuitable voltage can include any voltage that destroys the stored charges or otherwise corrupts the data stored therein. The alternate power source can include one or more of the following: a battery, a capacitor, and an energy storage device. Multiple capacitors in a parallel/series combination may be employed as well. Configuring the capacitors in parallel for charging and in series for discharging enables creating a high voltage, which may be necessary in certain circumstances.

FIG. 6 depicts the exemplary embodiment shown in FIG. 5 in a circuit block diagram. The sense circuit 55 senses interruption in the connection 58 between the flip chip 52 and the base chip 51. Upon sensing the interruption, the sense circuit 55 enables the read/write circuit to write random data (or any other pattern, such as all ones) into the memory 56. If the read/write circuit is disabled or lacks power, the alternate power source 57 can re-enable the read/write circuit 55. The alternate power source may consist of a capacitor, a battery, or other energy storage device. Alternatively, the sense circuit may be included in the flip chip 52.

FIG. 7 depicts an exemplary embodiment in a flow chart form of a continuity detection algorithm 70 according to one aspect of the present invention. The process 70 begins in a continuous loop checking the continuity of the flip-chip to the base chip (steps 71 and 72). Alternatively, the process can determine whether the proximity of the flip-chip to the base chip has been interrupted. There are numerous circuits that may be used to detect continuity or proximity, which are well known to one skilled in the art of circuit design One such implementation applies a constant current through the interconnections between the flip-chip and the base-chip with a current detection circuit on the return side. If the flip-chip is pried apart from the base chip breaking continuity, the current stops flowing, triggering the current detection circuit If continuity is broken (from step 72) the process 70 determines the status of the base chip. For example, the process 70 determines whether the base chip is operating in the normal-operating mode, or whether power is on (step 73). If the base chip is in the normal state, and power is on, the process 70 causes the read/write circuit to write random data to the memory (step 76).

If the base chip is not in the normal state, e.g., normal power is not being applied, then the process 70 determines whether the alternate power source can provide the necessary power to the read/write circuit (step 75). If so, the process performs the random write (step 76). If not, the process uses alternate power to damage the memory (77).

When the encryption key memory is on the flip-chip, prying off the flip chip removes power from the flip-chip. Therefore, alternate power must be used to destroy or erase memory data. A device to provide this power is fabricated on the flip-chip. Examples of alternate power sources include one or more of the following in combination or by themselves: one or more capacitors, batteries, such as small integrated circuit mounted batteries or tiny single use lithium batteries, etc.

According to one aspect of the present invention, a method for protecting information contained within an integrated circuit, includes splitting the functionality of an integrated circuit into two separate integrated circuits, and interconnecting the two separate integrated circuits in an interlocking manner. In this embodiment, the two circuits cannot operate without being connected together. Moreover, the interconnection can be monitored to further ensure the protection of the sensitive information stored therein. Furthermore, the information contained within the two separate integrated circuits can be destroyed upon detecting a break in the interconnection. As further protection from reverse engineering of the information contained in the two circuits, the two separate integrated circuits can be interconnected so that all conduction paths and charge storage sites are not accessible from the exterior, such as in a flip-chip configuration. In addition, rather than being destroyed, the information can be overwritten with random data upon detecting a break in the interconnection.

Figure 8:
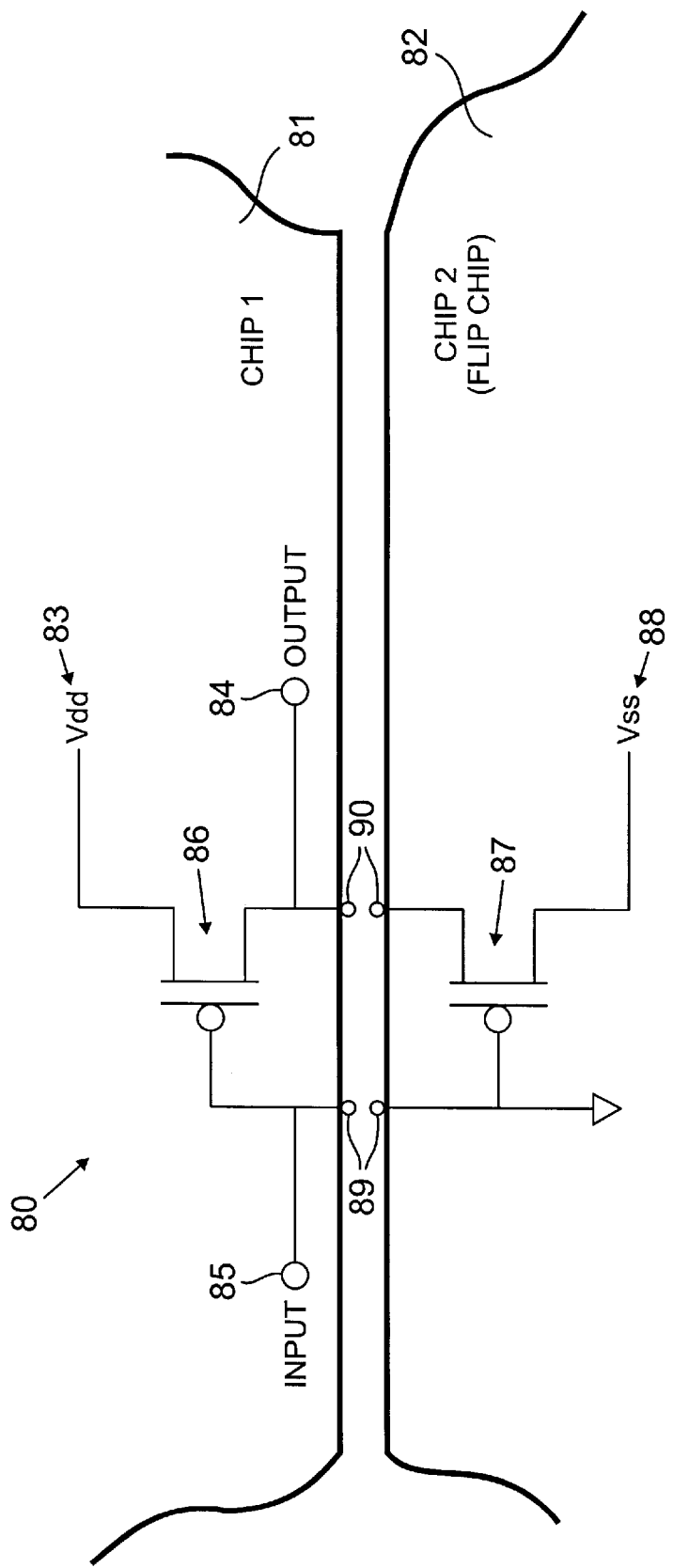
FIG. 8 depicts an exemplary embodiment of an apparatus for use in an SRAM configuration according to one aspect of the present invention.

FIG. 8 depicts an exemplary embodiment 80 of an apparatus for use in an SRAM configuration according to one aspect of the present invention Another potential solution to the problem being solved by the present invention involves separating the transistors 86, 87 of memory cells so that part of the transistors 86, 87 of the memory cell are fabricated on one chip 81 and the remainder are connected through solder bonds 89, 90 from the flip-chip 82. Such a device is depicted in FIG. 8.

In this embodiment 80, the input 85 and the output 86 are included on the same chip 81. Power Vdd 83 is received on the chip 81 and the supply voltage Vss 88 is provided on the flip chip 82. Essentially, the functionality of a single chip is split into two separate chips so that each chip includes a portion of the total functionality. Without the chips connected, the total functionality will be lost. Consequently, one cannot determine the state of the memory cells when the chips are pried apart. Splitting the transistors 86, 87 at the bonds 89, 90 will result in dissipation of the stored charge, thereby defeating any attempts at reverse engineering.

Hundreds of cells (even thousands, and perhaps millions) can be fabricated below the bond pad (i.e., solder connection pad). The connections for the cells can be routed to the solder pad through vias in the passivation layer. When the flip chip is assembled, the memory is complete. If the flip-chip is removed, then the memory cell is non-functional. In this embodiment, it is beneficial to have multiple false routings that will make reverse engineering of the circuit difficult to impossible. Placing transistors below bond pads further increases the difficulty of reverse engineering such a circuit.

Read-Only-Memory (ROM) presents a different set of problems. One can still separate the cells on the two chips. N-type cells can be placed on one chip and P-type cells can be placed on another chip (i e., the flip chip) or vice versa. Alternatively, the N-type and P-type transistors can be implemented on the same chip and the gates that ground the transistors can be placed on the flip-chip with connections going through the bond pads.

According to yet another aspect of the present invention, an apparatus for storing information in electronic form includes multiple memory cells and two integrated circuits. Each of the memory cells includes at least a first transistor pair and a second transistor pair. The memory cells stores the information in electronic form. The first integrated circuit has disposed therein each of the first transistor pairs of each of the memory cells. The second integrated circuit has disposed therein each of the second transistor pairs of each of the memory cells. The first and second integrated circuits are coupled together in a flip-chip configuration.

According to another aspect of the present invention, an apparatus for storing information in electronic form includes several memory cells and two integrated circuits. Each of the memory cells includes at least two transistors. The memory cells store the information in electronic form. One integrated circuit has disposed therein both of the transistors forming the memory cells. The other integrated circuit has disposed therein a ground coupled to each of the two transistors in the one integrated circuit. As in the above, the two integrated circuits are coupled together in a flip-chip configuration. Multiple solder bonds are provided via which the two transistors in each memory cell are coupled to the ground in the other integrated circuit. As discussed above, a continuity detection circuit monitors a continuity of connection between the two integrated circuits, and writes false data to the memory cells upon detecting a break in the continuity. In addition, two voltage supplies are provided both on the same chip, e.g., the chip without the ground.

Figure 9:
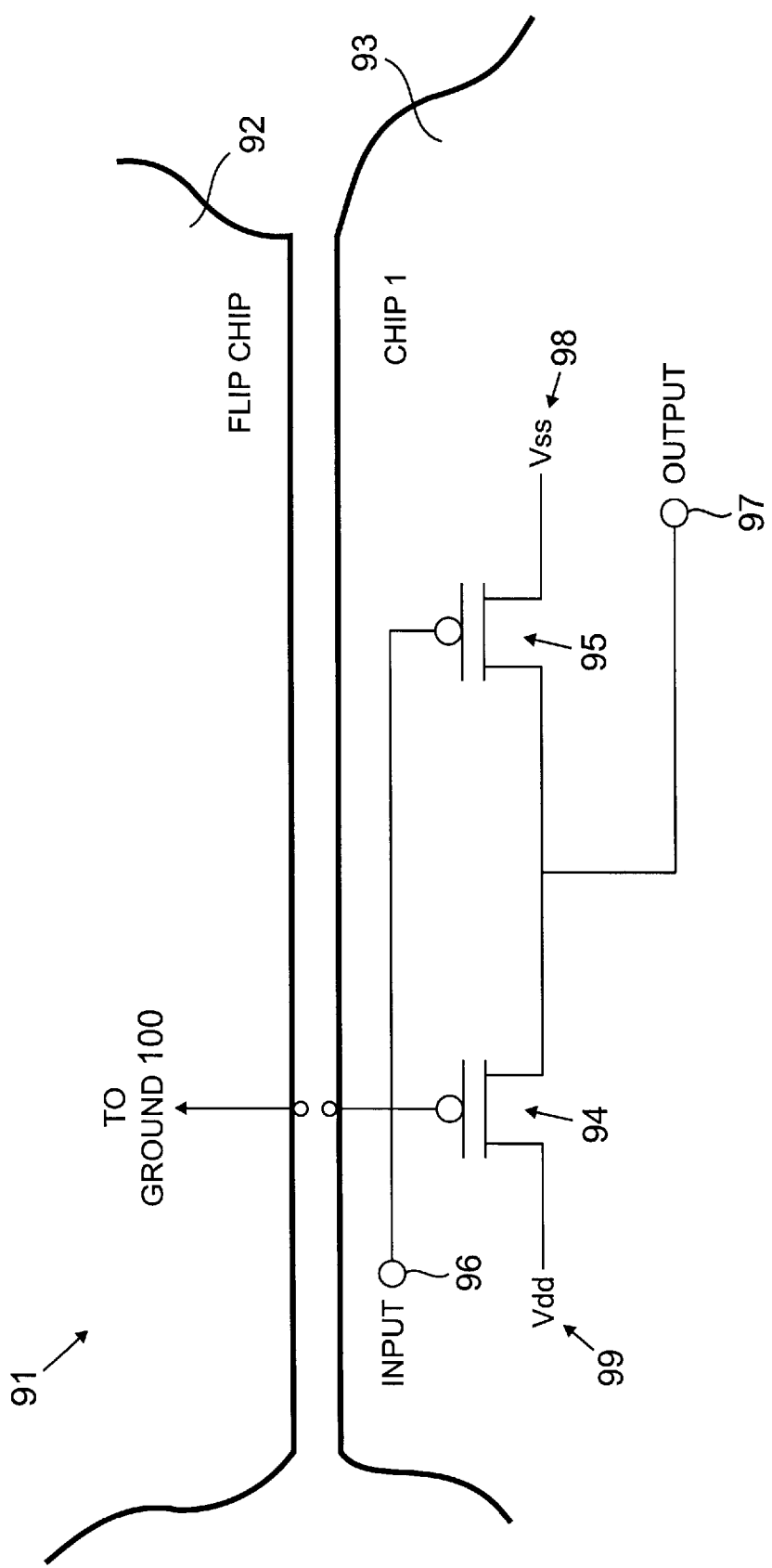
FIG. 9 depicts an exemplary embodiment of an apparatus according to one aspect of the present invention.

FIG. 9 depicts such an exemplary embodiment 91 of an apparatus according to one aspect of the present invention. In this embodiment 91, the transistors 94, 95 are coupled to ground 100 via the connections between the chips 92, 93. As a result, the memory cells will not function without connection to the flip chip 92. In this embodiment 91, the supply voltages Vdd and Vss are provided on the same chip 93. Input 96 and output 97 are also provided on the same chip 93. Without the flip-chip, one would not know which cells are programmed. The transistors and gates can be arranged under the pads to further inhibit reverse engineering.

Figure 10:
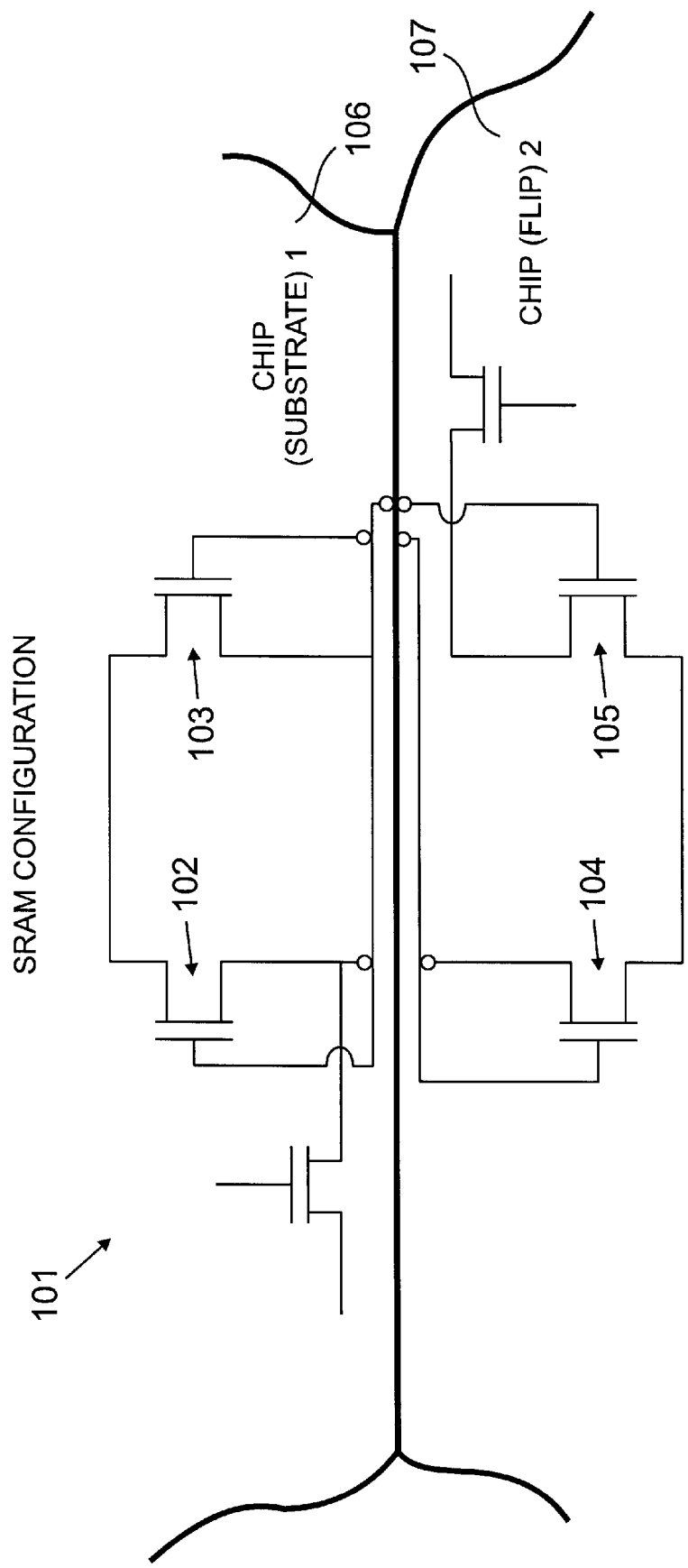
FIG. 10 depicts an exemplary embodiment of an apparatus according to one aspect of the present invention.

FIG. 10 depicts an exemplary embodiment of an apparatus according to one aspect of the present invention. In this embodiment 101 for use in an SRAM configuration, the transistors 102–105 are split so that the memory cell is split across two chips 106, 107. The transistors 102, 103 are disposed in chip 106 and the other transistors 104, 105 are disposed in chip 107. Adjacent transistors are interconnected in a similar manner.

In summary, the present invention provides several techniques and devices for protecting sensitive information stored on an integrated circuit. These techniques and devices prevent one from reverse engineering the circuit to decode the stored sensitive information by preventing physical access to the stored sensitive information and by altering the stored sensitive information upon detection of an attempt to defeat the physical security. In addition, the present invention provides a split integrated circuit whose functionality requires two separate chips to remain coupled together in a flip-chip manner. While the present invention has been explained in terms of several exemplary embodiments, the scope of the present invention is not limited to the above exemplary embodiments but by the claims set forth below.

What is claimed is:

1. A method for protecting information contained within an integrated circuit comprising the steps of splitting the functionality of a circuit-into two separate portions, implementing the two separate portions as two separate integrated circuits, interconnecting the two separate integrated circuits in an interlocking manner, and monitoring an interconnection of the two separate integrated circuits.

2. The method according to claim 1, further comprising the step of destroying the information contained within the two separate integrated circuits upon detecting a break in the interconnection of the two separate integrated circuits.

3. The method according to claim 1, further comprising the step of interconnecting the two separate integrated circuits so that all conduction paths and charge storage sites are not accessible from the exterior.

4. The method according to claim 1, wherein the two separate integrated circuits are connected in a flip-chip manner.

5. The method according to claim 1, further comprising, the step of writing random data to a memory upon detecting a break in the interconnection of the two, separate integrated circuits.

6. The method according to claim 1, further comprising the step of disposing at least a plurality of transistors storing sensitive information under a plurality of bond pads.

7. The method according to claim 1, further comprising the step of disposing at least a plurality of gates storing sensitive information below a plurality of bond pads.

8. An apparatus for storing information comprising:

a first integrated circuit having a plurality of charge storage sites in which charges are stored representing the information to be stored, a second integrated circuit being coupled to the first integrated circuit in a flip-chip configuration and preventing access to the plurality of charge storage sites, a detection circuit being disposed in one of the first and second integrated circuits and monitoring a connection between the first and second integrated circuits, said detection circuit altering the information stored in the first integrated circuit upon detecting a break in the connection between the first and second integrated circuits.

9. The apparatus according to claim 8, wherein the second integrated circuit is disposed over only a portion of the first integrated circuit.

10. The apparatus according to claim 8, wherein the first integrated circuit includes a plurality of conduction paths, and said second integrated circuit is coupled to the first integrated circuit so that the first integrated circuit covers the plurality of conduction paths.

11. The apparatus according to claim 8, further comprising a plurality of conduction paths coupling the first integrated circuit to the second integrated circuit, wherein said detection circuit monitors conduction continuity of one or more of the plurality of conduction paths.

12. The apparatus according to claim 8, further comprising a read-write circuit coupled to the detection circuit and the plurality of charge storage sites, said detection circuit enabling said read-write circuit to write false data to the plurality of charge storage sites upon detection of a break in continuity.

13. The apparatus according to claim 8, further comprising an alternate power source being coupled to the detection circuit and providing power to the detection circuit upon removal of normal supply power.

14. The apparatus according to claim 13, wherein the alternate power source also provides power to the read-write circuit upon removal of normal supply power.

15. The apparatus according to claim 13, wherein the alternate power source provides an unsuitable voltage to the plurality of charge storage sites upon detection of a break in the continuity by the detection circuit.

16. The apparatus according to claim 13, wherein the alternate power source includes one or more selected from the group of: a battery, a capacitor, and an energy storage device.

17. The apparatus according to claim 13, wherein the alternate power source includes a plurality of capacitors coupled in a parallel configuration during charging, and switched to a series configuration upon detection of a continuity fault.

18. An apparatus for storing information comprising:

a first integrated circuit having a plurality of charge storage sites in which charges are stored representing the information to be stored, a second integrated circuit being coupled to the first integrated circuit in a flip-chip configuration and preventing access to the plurality of charge storage sites, a proximity detection circuit being disposed in one of the first and second integrated circuits and monitoring a proximity of the first integrated circuit relative to the second integrate circuit, said proximity detection circuit altering the information stored in the first integrated circuit upon detecting a change in the proximity between the first and second integrated circuits.

19. The apparatus according to claim 18, wherein the second integrated circuit is disposed over only a portion of the first integrated circuit.

20. The apparatus according to claim 18, wherein the first integrated circuit includes a plurality of conduction paths, and said second integrated circuit is coupled to the first integrated circuit so that the first integrated circuit covers the plurality of conduction paths.

21. The apparatus according to claim 18, further comprising a read-write circuit coupled to the proximity detection circuit and the plurality of charge storage sites, said proximity detection circuit enabling said read-write circuit to write false data to the plurality of charge storage sites upon detection of a change in the proximity between the first and second integrated circuits.

22. The apparatus according to claim 18, further comprising an alternate power source being coupled to the proximity detection circuit and providing power, to the detection circuit upon removal of normal supply power.

23. The apparatus according to claim 22, wherein the alternate power source also provides power to the read-write circuit upon removal of normal supply power.

24. The apparatus according to claim 22, wherein the alternate power source provides an unsuitable voltage to the plurality of charge storage sites upon detection of a change in the proximity between the first and second integrated circuits.

25. The apparatus according to claim 22, wherein the alternate power source includes one or more selected from the group of: a battery, a capacitor, and an energy storage device.

\* \* \* \* \*